(12) United States Patent
Tubbs et al.

(10) Patent No.: US 11,034,429 B2
(45) Date of Patent: Jun. 15, 2021

(54) CEILING HEADER SYSTEM FOR AIRCRAFT CABIN

(71) Applicant: The Boeing Company, Chicago, IL (US)

(72) Inventors: Gregory A. Tubbs, Seattle, WA (US); Paul J. Wilcynski, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 396 days.

(21) Appl. No.: 16/112,068

(22) Filed: Aug. 24, 2018

(65) Prior Publication Data

US 2020/0062370 A1 Feb. 27, 2020

(51) Int. Cl.
*B64C 1/00* (2006.01)
*B64C 1/06* (2006.01)
*B64D 11/00* (2006.01)

(52) U.S. Cl.
CPC .......... *B64C 1/066* (2013.01); *B64D 11/0015* (2013.01); *B64D 11/0023* (2013.01)

(58) Field of Classification Search
CPC .............................. B64C 1/066; B64D 11/0023
See application file for complete search history.

(56) References Cited

U.S. PATENT DOCUMENTS

| | | | | |
|---|---|---|---|---|
| 5,086,540 A * | 2/1992 | Schumacher | ...... | B64D 11/0023 16/87.4 R |
| 5,816,534 A * | 10/1998 | Schumacher | ...... | B64D 11/0023 244/119 |
| 6,523,779 B1 * | 2/2003 | Michel | ............... | B64D 11/0023 244/118.5 |
| 7,530,529 B2 * | 5/2009 | Bock | .................. | B64D 11/0023 244/118.5 |
| 8,636,256 B2 * | 1/2014 | Mosler | ............... | B64D 11/0023 248/264 |
| 8,756,760 B2 * | 6/2014 | Ulbrich-Gasparevic | .................... | A47H 1/04 16/87.4 R |
| 8,814,089 B2 * | 8/2014 | Chandler | ........... | B64D 11/0023 244/118.5 |
| 8,869,865 B2 * | 10/2014 | Roach | ................. | B64D 11/0023 160/84.04 |
| 9,139,301 B2 * | 9/2015 | Slyter | ................ | B64D 11/0023 |
| 9,856,695 B2 * | 1/2018 | Leadens, II | ........ | B64D 11/0023 |
| 10,472,067 B2 * | 11/2019 | Breuer | ................. | B64D 11/003 |
| 10,556,685 B2 * | 2/2020 | Sexton | ............... | B64D 11/0023 |
| 10,737,788 B2 * | 8/2020 | Slyter | ...................... | A47H 1/18 |
| 10,793,276 B2 * | 10/2020 | Radacovici | .......... | B64D 11/003 |

(Continued)

*Primary Examiner* — Philip J Bonzell
*Assistant Examiner* — Michael B. Kreiner
(74) *Attorney, Agent, or Firm* — McDonnell Boehnen Hulbert & Berghoff LLP

(57) ABSTRACT

Disclosed herein is an example ceiling header system for an aircraft cabin that includes a ceiling between a first storage bin and a second storage bin. The ceiling header system includes a ceiling header that includes a top surface that conforms to the ceiling and a bottom surface that is opposite the top surface. The ceiling header system also includes a curtain track. The top surface is configured to be held against the ceiling via the curtain track being placed against the bottom surface, the curtain track being (i) attachable at a first end of the curtain track to a first rail of the first storage bin and (ii) attachable at a second end of the curtain track to a second rail of the second storage bin.

20 Claims, 15 Drawing Sheets

(56) References Cited

U.S. PATENT DOCUMENTS

2008/0313964 A1\* 12/2008 Michel ............... B64D 11/0023
  49/409
2016/0264243 A1\* 9/2016 Madhav ............... B64D 11/003
2018/0148172 A1\* 5/2018 Verbeque ............ B64D 11/0023
2018/0297707 A1\* 10/2018 Gharia ............... B64D 11/0023
2019/0106213 A1\* 4/2019 Minyard .............. B64D 11/003
2019/0118947 A1\* 4/2019 Slyter ...................... A47H 1/18

\* cited by examiner

CEILING HEADER SYSTEM FOR AIRCRAFT CABIN

FIELD

The present disclosure generally relates to ceiling header systems for aircraft cabins, and more specifically to ceiling header systems that are customizable and deployable at various locations within an aircraft cabin.

BACKGROUND

Commercial aircraft (e.g., airliners) often have cabins that are separated, at least in part, by a curtain into an economy class area and a business class area. The curtain generally hangs from a curtain track that is positioned against and/or attached to a bottom surface of a specialized ceiling panel that extends below adjacent ceiling panels. Typical ceiling panels (e.g., panels not involved with deployment of the curtain track) are often curved to some degree. The specialized ceiling panel is typically designed to take the place of a typical ceiling panel to provide a (e.g., flat) surface against which the curtain track can be positioned. The specialized ceiling panel, the curtain track, and the curtain (when closed) generally block some light that would otherwise pass between the economy class area and the business class area.

Due to changing consumer demand, for example, a commercial airline might decide to increase or decrease the area of the cabin that is designated for business class seating. Thus, it might be beneficial to move the curtain and curtain track (e.g., the boundary between economy class and business class) aft or forward within the cabin. Using conventional ceiling panels, this typically involves detaching the specialized ceiling panel from the frame of the aircraft, detaching another ceiling panel that is located at the new desired location for the curtain, and reinstalling the ceiling panels in their new locations. This can be labor and time intensive. Additionally, since the ceiling panels are relatively large and the location of the curtain track is generally fixed with respect to the specialized ceiling panel, it might not be feasible to position the curtain at the exact desired location. Also, current specialized ceiling panels generally have a curtain track attached at a specific angle, which can be limiting in situations where customizable curtain deployment angles (e.g., angles other than perpendicular to the aisle of the aircraft cabin) are desirable. Thus, a need exists for an aircraft ceiling system that is easier to install and modify, and that allows for better pinpoint positional and angular deployment of the curtain and the curtain track.

SUMMARY

One aspect of the disclosure is a ceiling header system for an aircraft cabin that includes a ceiling between a first storage bin and a second storage bin. The ceiling header system includes a ceiling header that includes a top surface that conforms to the ceiling and a bottom surface that is opposite the top surface. The ceiling header system also includes a curtain track. The top surface is configured to be held against the ceiling via the curtain track being placed against the bottom surface, the curtain track being (i) attachable at a first end of the curtain track to a first rail of the first storage bin and (ii) attachable at a second end of the curtain track to a second rail of the second storage bin.

Another aspect of the disclosure is a ceiling header system for an aircraft cabin that includes a ceiling between a first storage bin and a second storage bin. The ceiling header system includes a first ceiling header that includes a first top surface that conforms to the ceiling and a first side surface that is adjacent to the first top surface. The first side surface extends away from the first top surface moving from a first end of the first ceiling header toward a second end of the first ceiling header. The ceiling header system also includes a substantially flat ceiling panel that is attachable to the first ceiling header at the second end of the first ceiling header.

A further aspect of the disclosure is a method of installing a ceiling header system in an aircraft cabin that includes a ceiling between a first storage bin and a second storage bin. The method includes placing a top surface of a ceiling header against the ceiling such that the top surface conforms to the ceiling, placing a curtain track against a bottom surface of the ceiling header, and attaching a first end of the curtain track to a first rail of the first storage bin and attaching a second end of the curtain track to a second rail of the second storage bin such that the top surface is held against the ceiling by the curtain track.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Figure 1:
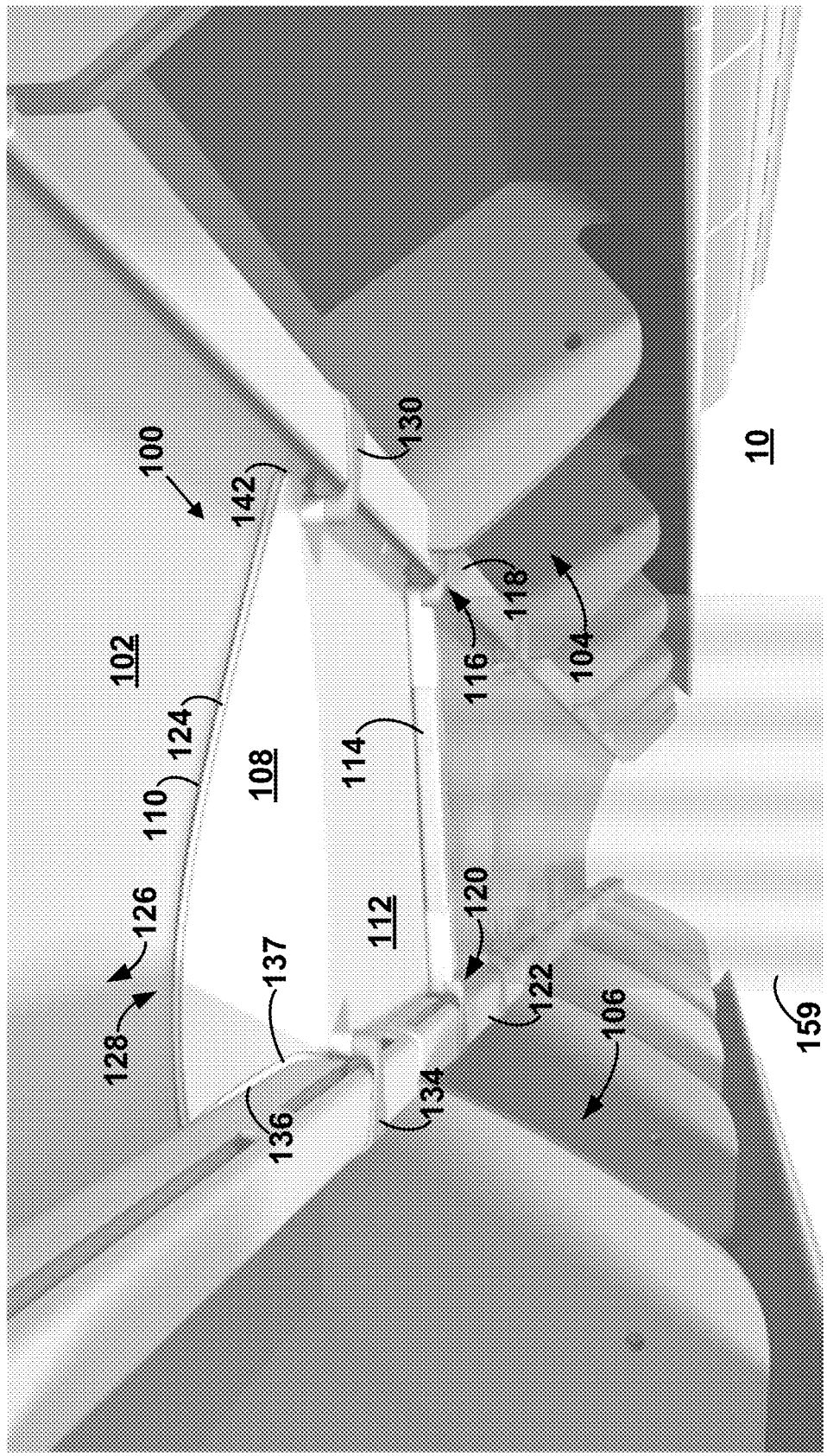
FIG. 1 is a schematic rear view of a ceiling header system installed within in aircraft cabin, according to an example.

As discussed above, there exists a need for an aircraft cabin ceiling system that is easier to install and modify, and that allows for better pinpoint positional and angular deployment of the curtain and the curtain track. Accordingly, this disclosure is related to such ceiling header systems and methods for installing them in an aircraft cabin.

Within examples, a ceiling header system is installable in an aircraft cabin that includes a ceiling between a first storage bin and a second storage bin. The first storage bin can be part of a first row of storage bins that is aligned parallel with an aisle that is between seats of the aircraft cabin, and the second storage bin can be part of a second row of storage bins that is aligned parallel with the aisle as well. As such, the first row of storage bins and the second row of storage bins might be located on opposing sides of the aisle.

The ceiling header system includes a ceiling header that includes a top (e.g., convex) surface that conforms to the (e.g., concave) ceiling of the aircraft cabin, and a bottom (e.g., flat) surface that is opposite the top surface of the ceiling header. The ceiling header system also includes a curtain track from which a curtain that separates business class from economy class can be hung. The top surface of the ceiling header is configured to be held against the ceiling via the curtain track being placed against the bottom surface of the ceiling header. The curtain track is (i) attachable at a first end of the curtain track to a first rail of the first storage bin and (ii) attachable at a second end of the curtain track to a second rail of the second storage bin.

In some embodiments, the curtain track is not directly attached to the ceiling header, which allows for the curtain track to be deployed at customizable angles with respect to the ceiling header and/or the aisle of the aircraft cabin. That is, the first end of the curtain track can be positioned forward of the second end of the curtain track or the second end of the curtain track can be positioned forward of the first end of the curtain track.

The ceiling header systems disclosed herein can also be more easily installed, removed, or repositioned than previous systems. Additionally, the disclosed ceiling headers can be installed at any position along a typical aircraft cabin ceiling, without regard to the position of any of the ceiling tiles forming the ceiling. Thus, the ceiling header systems allow for curtain track placement that is highly customizable.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Referring now to FIG. 1, an example ceiling header system 100 for an aircraft cabin 10 is illustrated. The aircraft cabin 10 includes a ceiling 102 between a first storage bin 104 and a second storage bin 106 (e.g., between two rows of storage bins). The ceiling header system 100 includes a ceiling header 108 that includes a top surface 110 that conforms to the ceiling 102. The ceiling header 108 also includes a (e.g., flat) bottom surface 112 that is opposite the top surface 110. The ceiling header system 100 also includes a curtain track 114. The top surface 110 is configured to be held against the ceiling 102 via the curtain track 114 being placed against the bottom surface 112. The curtain track 114 is (i) attachable at a first end 116 of the curtain track 114 to a first rail 118 of the first storage bin 104 and (ii) attachable at a second end 120 of the curtain track 114 to a second rail 122 of the second storage bin 106.

The ceiling 102 can be composed of one or more modular ceiling tiles (e.g., formed of plastic or other lightweight materials) that are attached to a frame of the aircraft. At least a portion 126 of the ceiling 102 is concave and at least a portion 128 of the top surface 110 is convex to conform to the ceiling 102. Other portions of the ceiling 102 can be considered concave as well. In addition, other portions of the top surface 110 can be considered convex.

The ceiling header 108 is typically formed of plastic or other lightweight materials. The ceiling header 108 can take the form of a plastic shell, for example. The top surface 110 of the ceiling header 108 includes a compressible gasket 124 (e.g., a rubber or foam gasket). The compressible gasket 124 helps to form an area of contact between the top surface 110 and the ceiling 102 through which very little light is able to pass. As shown in FIG. 1, the top surface 110 spans substantially all of the distance along the ceiling 102 between the first rail 118 and the second rail 122. The ceiling header 108 generally provides light blocking above and between the first rail 118 and the second rail 122 and provides the bottom surface 112 against which the curtain track 114 can be placed.

A curtain 159 is coupled to and/or hung from the curtain track 114. The curtain 159 can be used to separate a business class seating area from an economy class seating area in the aircraft cabin 10 and to reduce the amount of light that travels between the economy class area and the business class area. The curtain track 114 could have telescopic features configured for adjusting a length of the curtain track 114 as desired (e.g. to match the distance between the first rail 118 and the second rail 122).

Figure 2A:
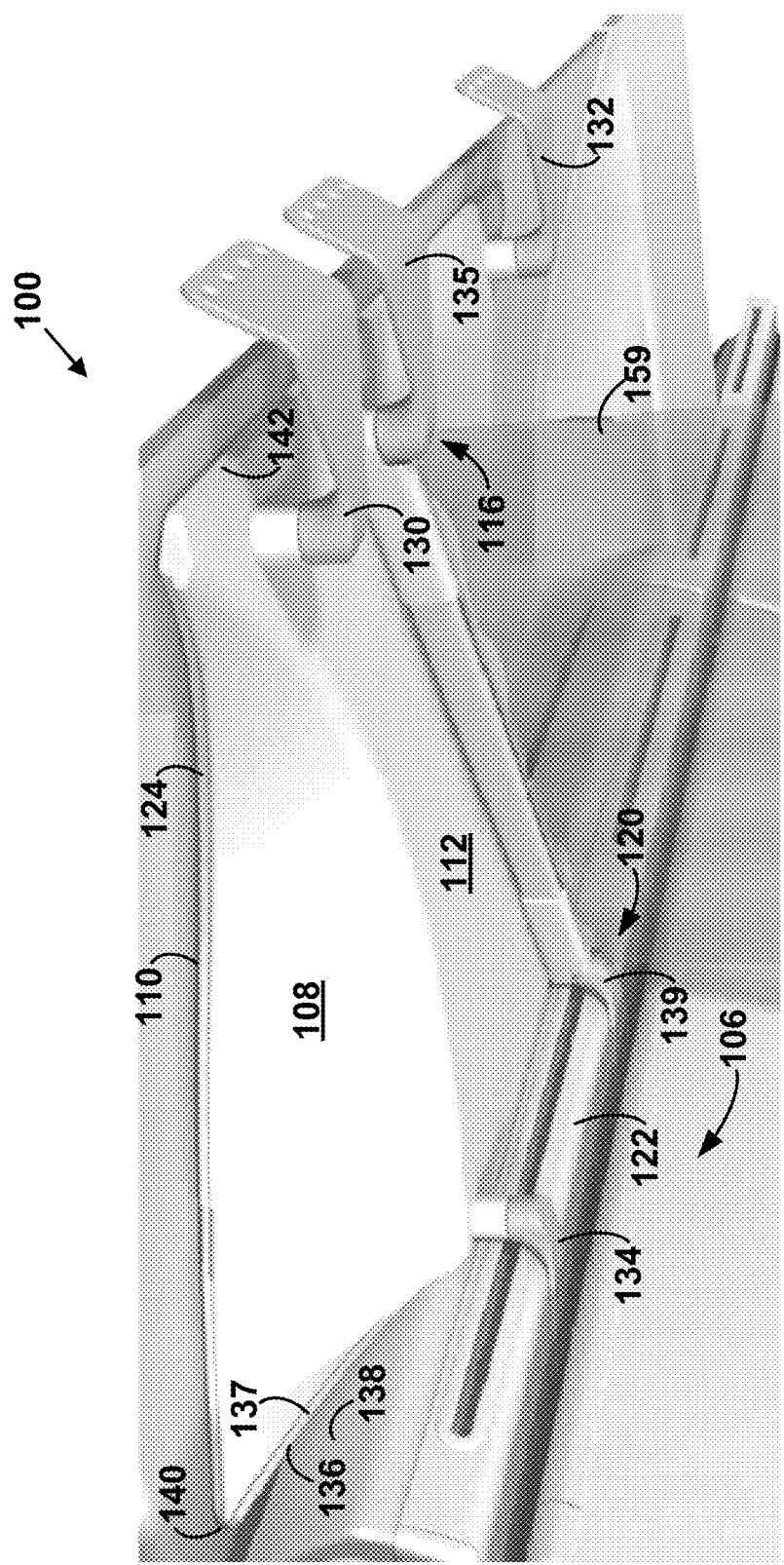
FIG. 2A is a schematic rear perspective view of a ceiling header system installed within in aircraft cabin, according to an example.

Referring to FIG. 2A, the top surface 110 extends beyond the bottom surface 112 to form a first edge 140 of the ceiling header 108 with a concave side surface 136 of the ceiling header 108. The concave side surface 136 conforms to a convex surface 138 of the second rail 122. The concave side surface 136 includes a compressible gasket 137 that is similar to the compressible gasket 124. The compressible gasket 137 forms a seal through which very little light can pass between the convex surface 138 and the concave side surface 136. The concave side surface 136 is positioned between the top surface 110 and the bottom surface 112. The top surface 110 meets the bottom surface 112 at a second edge 142 of the ceiling header 108. The first edge 140 is adjacent to the second rail 122 and the second edge 142 is adjacent to the first rail 118 (shown in FIG. 1).

Referring to FIG. 2A, the top surface 110 is configured to be held against the ceiling 102 via the curtain track 114 being placed against the bottom surface 112 such that the second end 120 of the curtain track 114 is forward of the first end 116 of the curtain track 114. In other examples, the first end 116 of the curtain track 114 is forward of the second end 120 of the curtain track 114.

The ceiling header system 100 also includes a first support fitting 130 attached to the bottom surface 112. Referring to FIG. 1, the first support fitting 130 is configured to attach the ceiling header 108 to the first rail 118. This is described in more detail below.

Referring to FIG. 2A, the ceiling header system 100 also includes a second support fitting 132 attached to the bottom surface 112. The second support fitting 132 (shown but not labeled in FIG. 1 for ease of illustration) is configured to attach the ceiling header 108 to the first rail 118.

The ceiling header system 100 also includes a third support fitting 134 attached to the bottom surface 112. The third support fitting 134 is configured to attach the ceiling header 108 to the second rail 122.

Figure 2B:
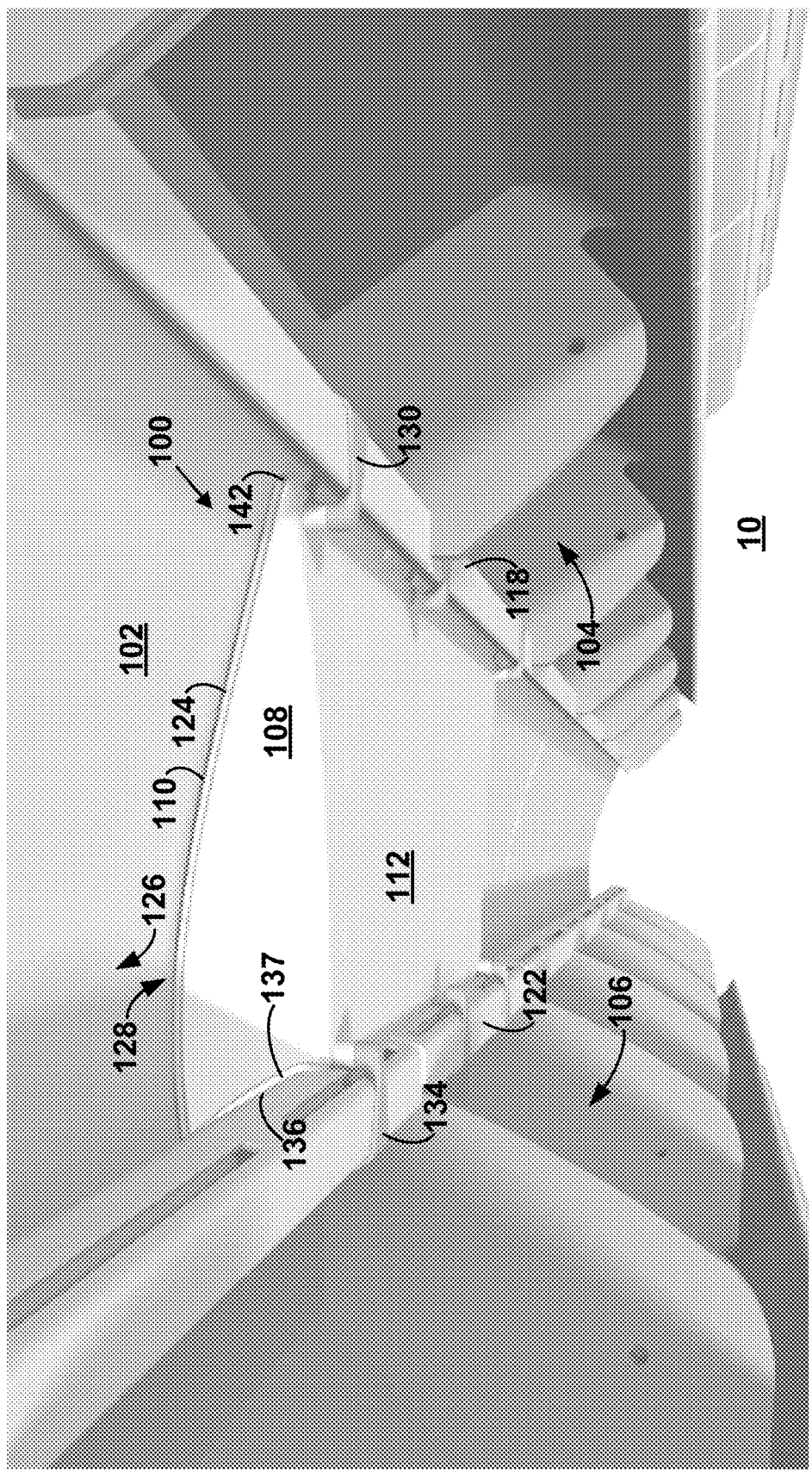
FIG. 2B is a schematic rear view of a ceiling header installed within in aircraft cabin, according to an example.

FIG. 2B is a rear view of the ceiling header 108. The curtain track 114 and the curtain 159 are not shown in FIG. 2B to yield an unobstructed view of the ceiling header 108.

Figure 2C:
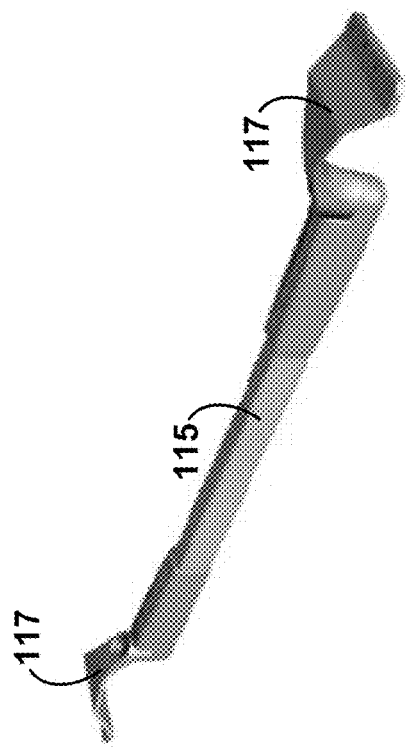
FIG. 2C is a perspective view of a curtain track, according to an example.
Figure 2D:
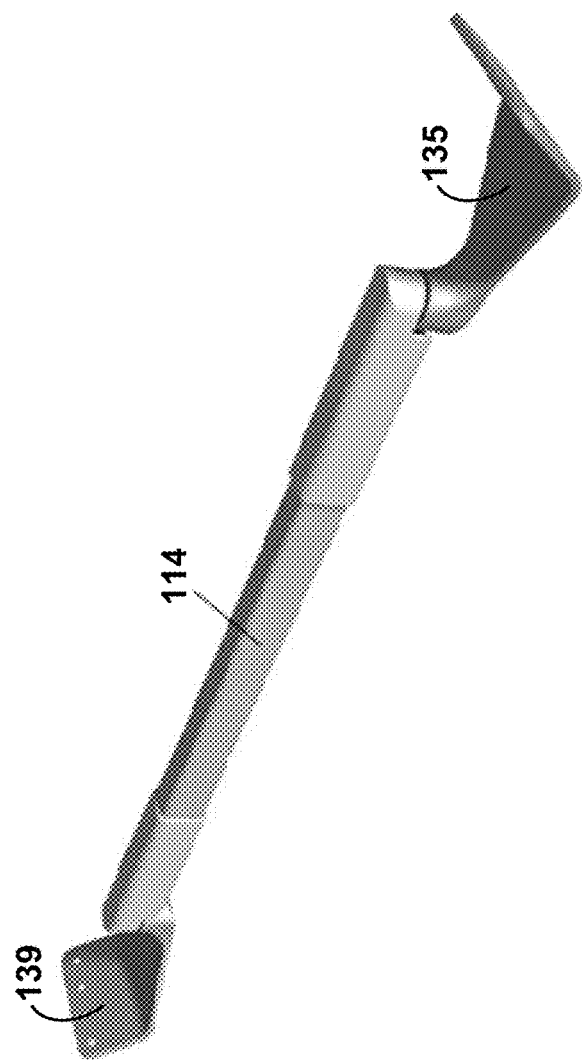
FIG. 2D is a perspective view of a curtain track, according to an example.

FIG. 2C is a perspective view of a curtain track 115. The curtain track 115 is generally similar to the curtain track 114, with one difference being that the curtain track 115 includes different support fittings 117 at opposing ends of the curtain track 115. The support fittings 117 are different in shape from the support fitting 135 and the support fitting 139, as shown in FIG. 2D.

Figure 3:
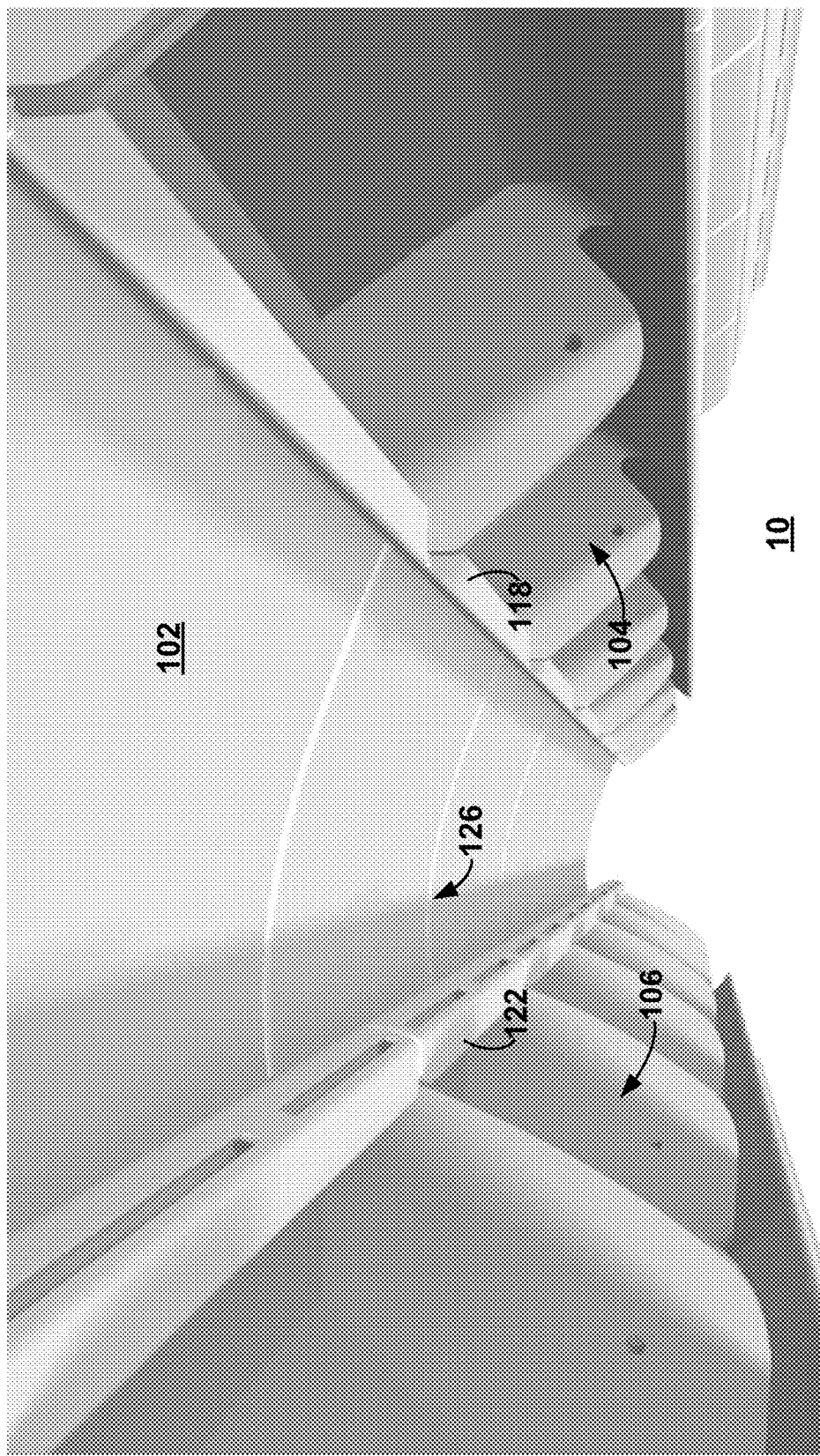
FIG. 3 is a schematic rear view of an aircraft cabin, according to an example.

FIG. 3 is a rear view of the aircraft cabin 10. The ceiling header system 100 is not shown in FIG. 3 to yield an unobstructed view of the aircraft cabin 10.

Figure 4:
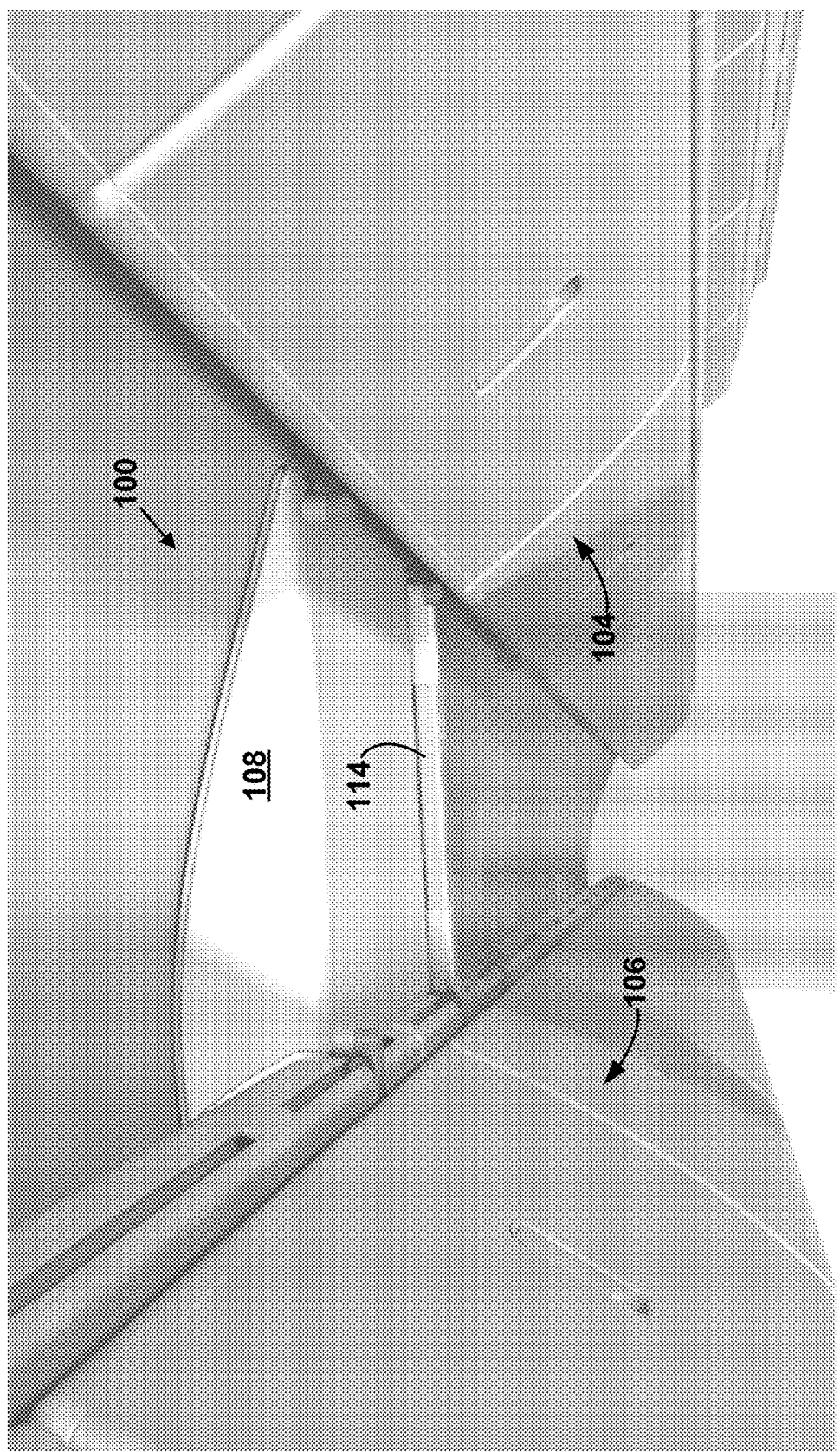
FIG. 4 is a schematic rear view of a ceiling header system installed within in aircraft cabin, according to an example.

FIG. 4 is a rear view of the ceiling header system 100 with doors of the storage bins shown.

Figure 5:
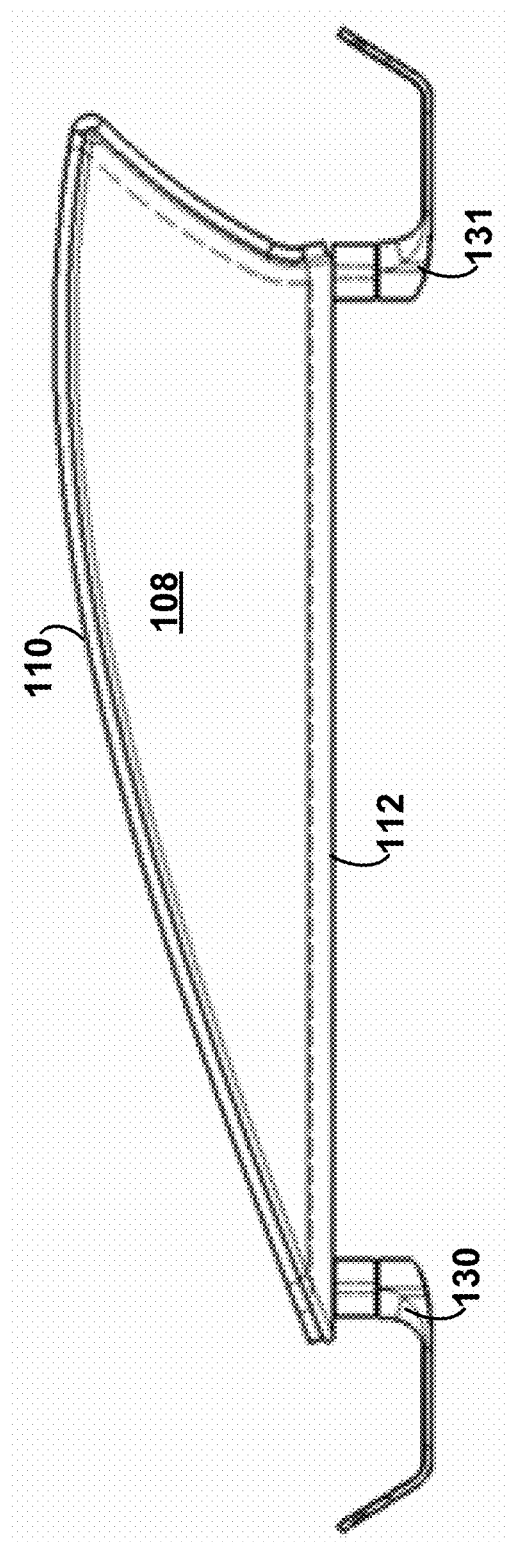
FIG. 5 is a schematic front view of a ceiling header, according to an example.

FIG. 5 is a front view of the ceiling header 108. This front view shows an additional support fitting 131 that can have any of the features of the other support fittings discussed herein.

Figure 6:
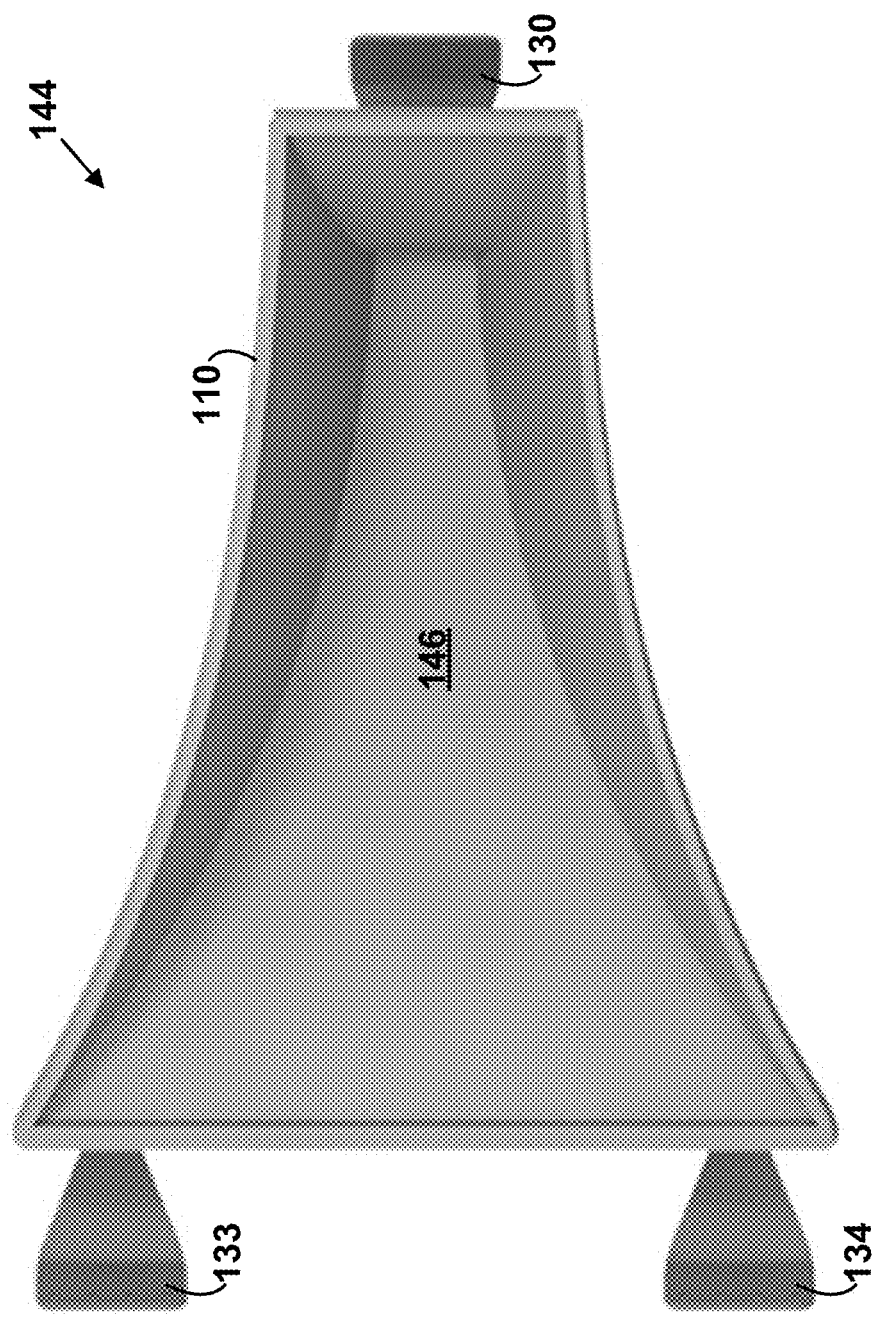
FIG. 6 is a schematic top view of a ceiling header, according to an example.

FIG. 6 is a top view of the top surface 110. The top surface 110 defines a perimeter 144 of an open top end 146 of the ceiling header 108. In other examples, a top end of the ceiling header 108 might be closed. That is, the ceiling header 108 might take a form other than a hollow shell. FIG. 6 shows the ceiling header having a right end that is narrower than the left end of the ceiling header, but other configurations are possible. FIG. 6 also shows an additional support fitting 133 that can be similar to any other support fitting discussed herein.

Figure 7:
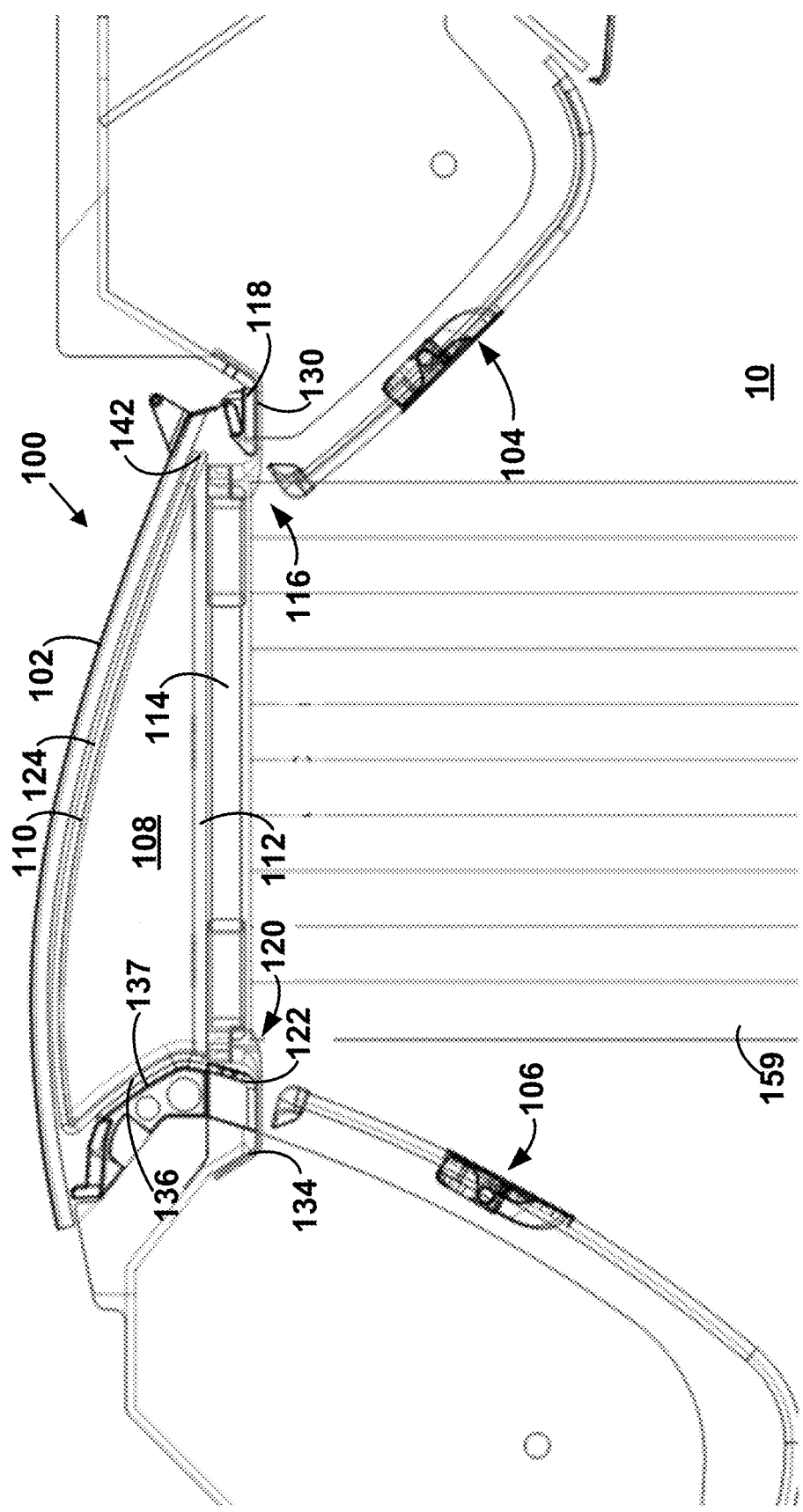
FIG. 7 is a rear cross sectional view of a ceiling header system installed within in aircraft cabin, according to an example.

FIG. 7 is a rear cross sectional view of the ceiling header system 100.

Figure 8:
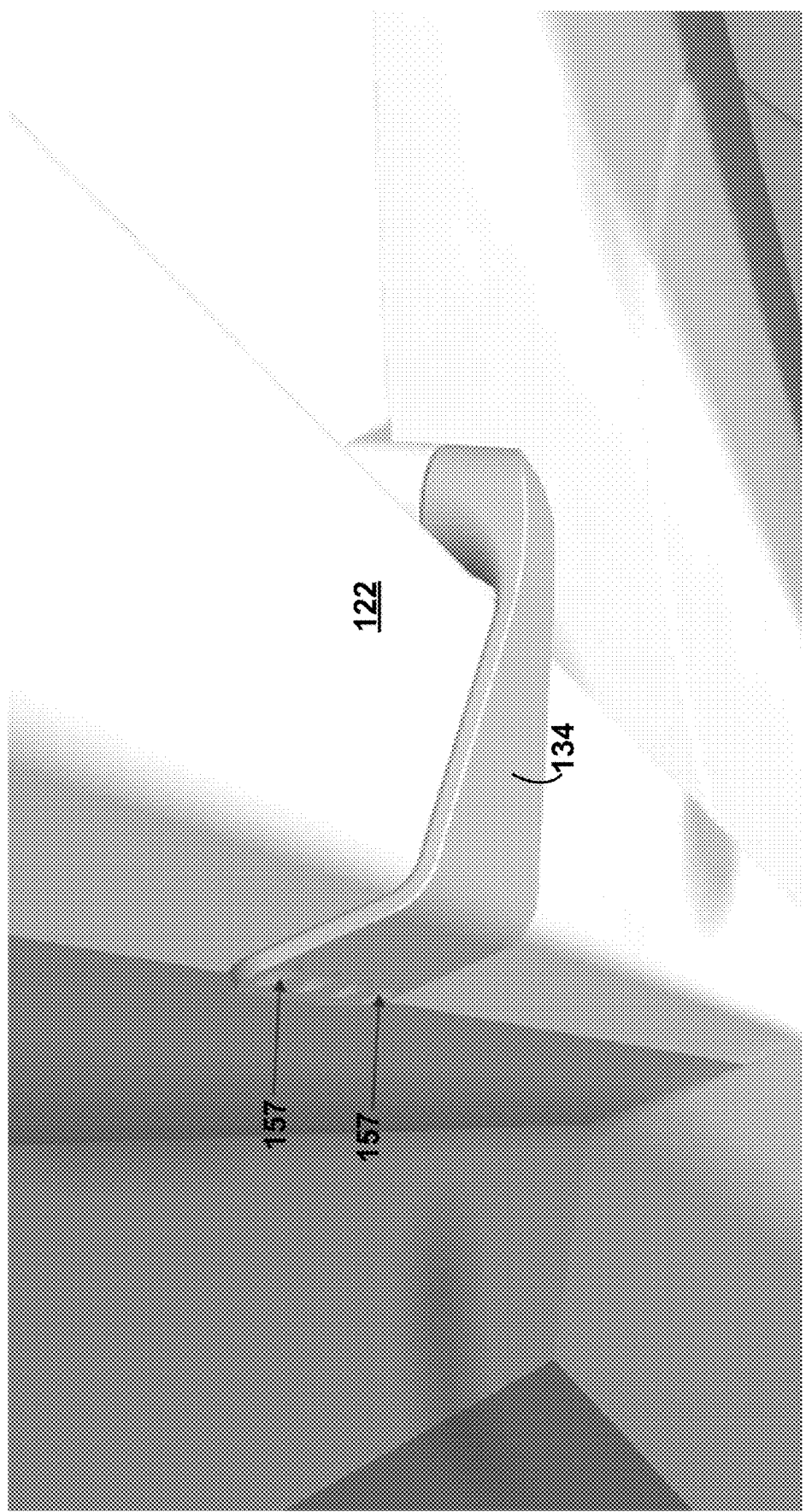
FIG. 8 is a schematic close up view of a support fitting, according to an example.

FIG. 8 is a schematic close up view of the third support fitting 134. The third support fitting 134 can be attached to the second rail 122 via fasteners (not shown) inserted through holes 157 in the third support fitting 134. Other support fittings described herein can be attached via fasteners in a similar fashion to the first rail 118 or the second rail 122.

Figure 9:
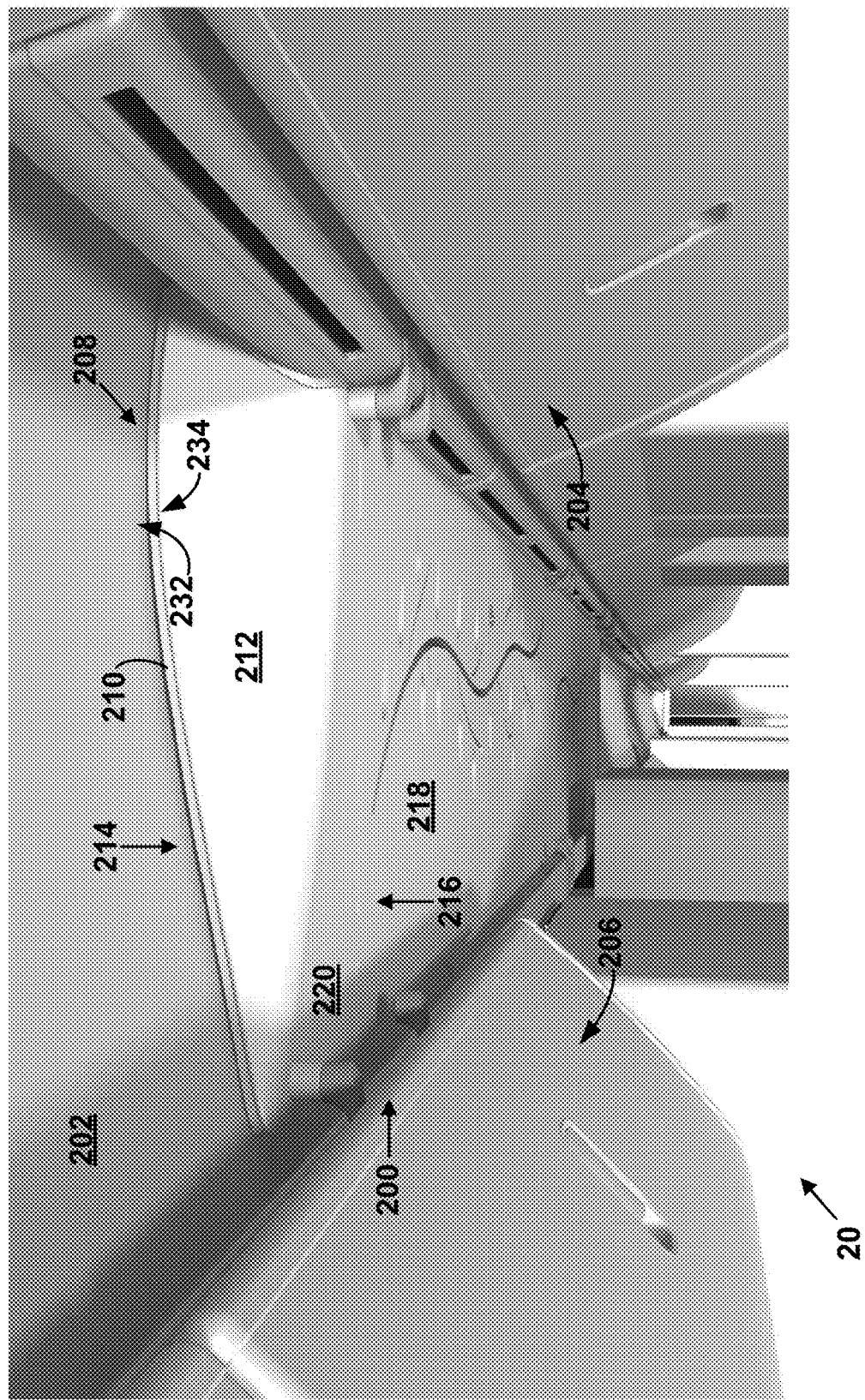
FIG. 9 is a schematic front view of a ceiling header system installed within in aircraft cabin, according to an example.

FIG. 9 is a schematic front view of a ceiling header system 200 installed within an aircraft cabin 20 that includes a ceiling 202 between a first storage bin 204 and a second storage bin 206. At one end, the ceiling header system 200 provides a transition, via a first ceiling header 208, from the ceiling 202 into one or more substantially flat ceiling panels hung below the ceiling 202. The one or more substantially flat ceiling panels can provide a storage area between the ceiling 202 and the one or more substantially flat ceiling panels, as described below. On an opposite end of the ceiling header system 200, a second ceiling header 222 (see FIG. 10) can provide a transition from the one or more substantially flat ceiling panels back to the ceiling 202. The one or more substantially flat ceiling panels can provide functional or aesthetic features, as described below.

The ceiling header system 200 includes the first ceiling header 208 that includes a first top surface 210 that conforms to the ceiling 202 and a first side surface 212 that is adjacent to the first top surface 210. The first side surface 212 extends away from the first top surface 210 moving from a first end 214 of the first ceiling header 208 toward a second end 216 of the first ceiling header 208. The ceiling header system 200 also includes a substantially flat ceiling panel 218 that is attachable to the first ceiling header 208 at the second end 216 of the first ceiling header 208.

The first ceiling header 208 also includes a first flat bottom surface 220 between the first side surface 212 and the second end 216 of the first ceiling header 208. Thus, the first side surface 212 and the first flat bottom surface 220 provide a transition from the ceiling 202 into the substantially flat ceiling panel 218 which is hung below the ceiling 202. The first ceiling header 208 can include any of the features of the ceiling header 108 described above.

The ceiling 202 can be composed of one or more modular ceiling tiles (e.g., formed of plastic or other lightweight materials) that are attached to a frame of the aircraft. At least a portion 232 of the ceiling 202 is concave and at least a portion 234 of the first top surface 210 is convex to conform to the ceiling 202. Other portions of the ceiling 202 can be considered concave as well. In addition, other portions of the first top surface 210 can be considered convex.

Figure 10:
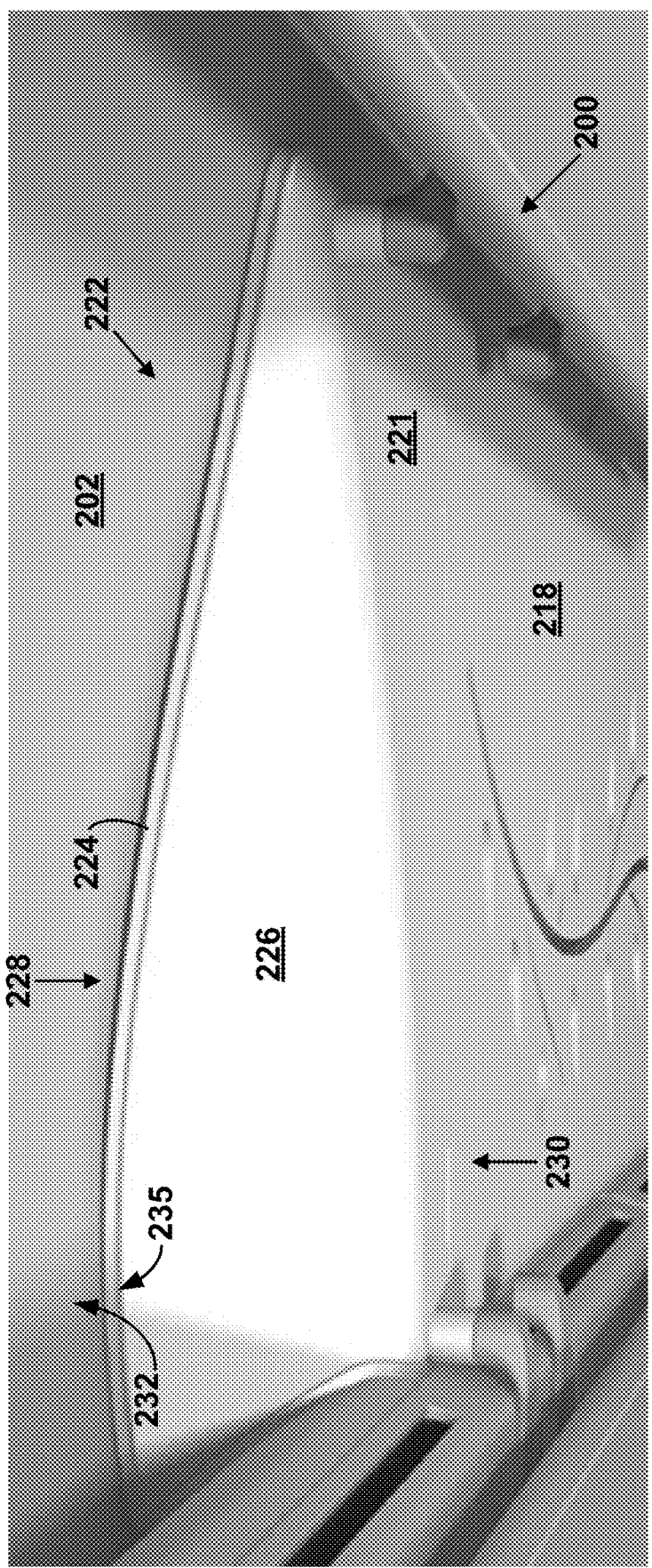
FIG. 10 is a schematic rear view of a ceiling header system installed within in aircraft cabin, according to an example.

FIG. 10 is a schematic rear view of the ceiling header system 200. The ceiling header system 200 includes a second ceiling header 222. The second ceiling header 222 includes a second top surface 224 that conforms to the ceiling 202 and a second side surface 226 that is adjacent to the second top surface 224. The second side surface 226 extends away from the second top surface 224 moving from a first end 228 of the second ceiling header 222 toward a second end 230 of the second ceiling header 222. The substantially flat ceiling panel 218 is attachable to the second ceiling header 222 at the second end 230 of the second ceiling header 222.

The second ceiling header 222 also includes a second flat bottom surface 221 between the second side surface 226 and the second end 230 of the second ceiling header 222. Thus, the second side surface 226 and the second flat bottom surface 221 provide a transition from the ceiling 202 into the substantially flat ceiling panel 218 which is hung below the ceiling 202. The second ceiling header 222 can include any of the features of the ceiling header 108 described above. At least a portion 235 of the second top surface 224 is convex to conform to the portion 232 of the ceiling 202.

Figure 11A:
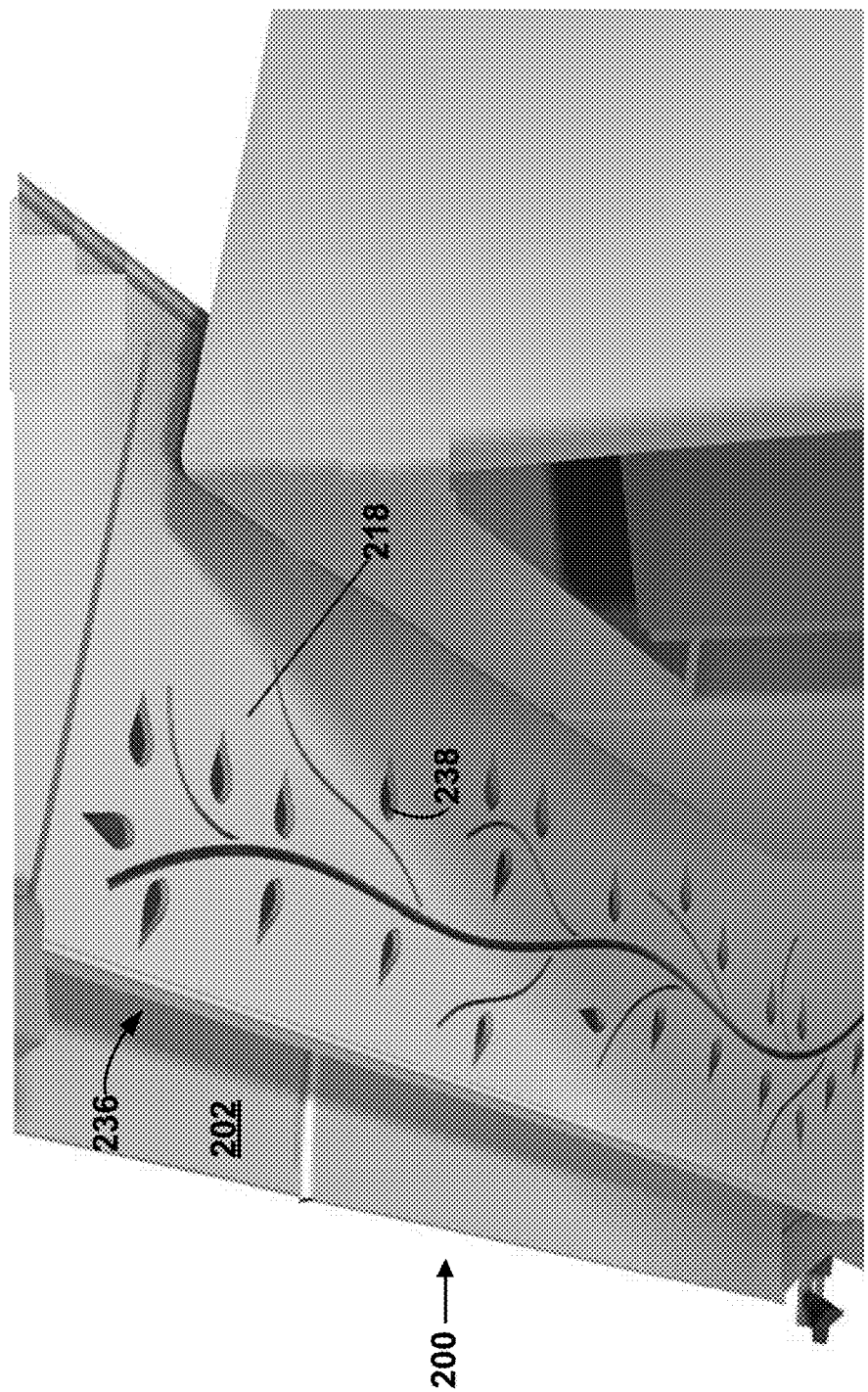
FIG. 11A is a schematic perspective view of a ceiling panel, according to an example.

FIG. 11A is a schematic perspective view of the substantially flat ceiling panel 218. The ceiling header system 200 provides a storage area 236 between the ceiling 202 and the substantially flat ceiling panel 218 when the ceiling header system 200 is installed in the aircraft cabin 20.

The substantially flat ceiling panel 218 includes a transparent or translucent aperture 238. Light sources can be installed above such transparent or translucent apertures. As shown in FIG. 11A, the transparent or translucent aperture 238 serves as an aesthetically pleasing lighting feature, but the transparent or translucent aperture 238 can be purposed for more functional lighting applications as well (e.g., passenger reading lights or emergency lighting).

Figure 11B:
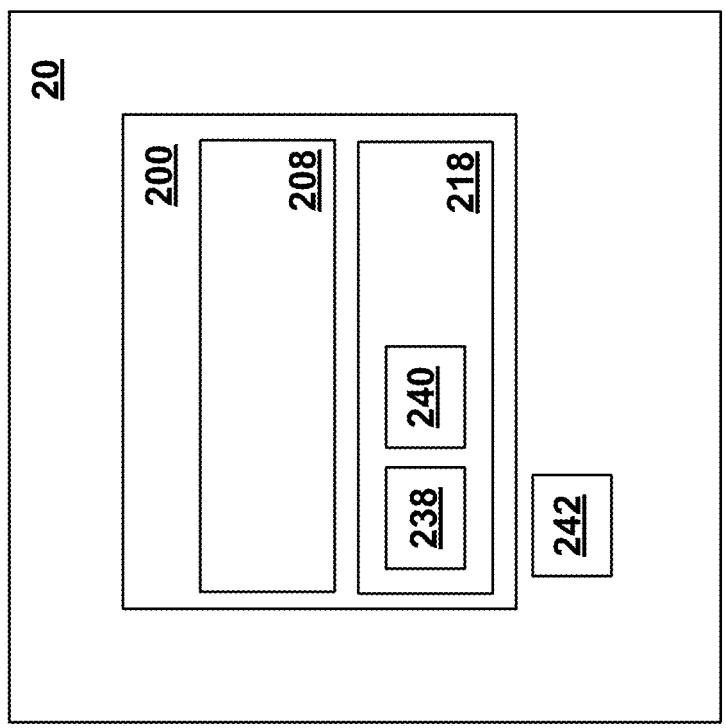
FIG. 11B is a schematic block diagram of a ceiling header system, according to an example.

FIG. 11B is a schematic block diagram of the ceiling header system 200, as installed within the aircraft cabin 20. As shown, the substantially flat ceiling panel 218 includes a light source, a speaker, or a display screen 240 that is configured to be electrically coupled to a power source 242 in the aircraft cabin 20. For example, a light source might be attached above the transparent or translucent aperture 238, or a speaker or a display screen might be installed within an open aperture within the substantially flat ceiling panel 218.

Figure 12:
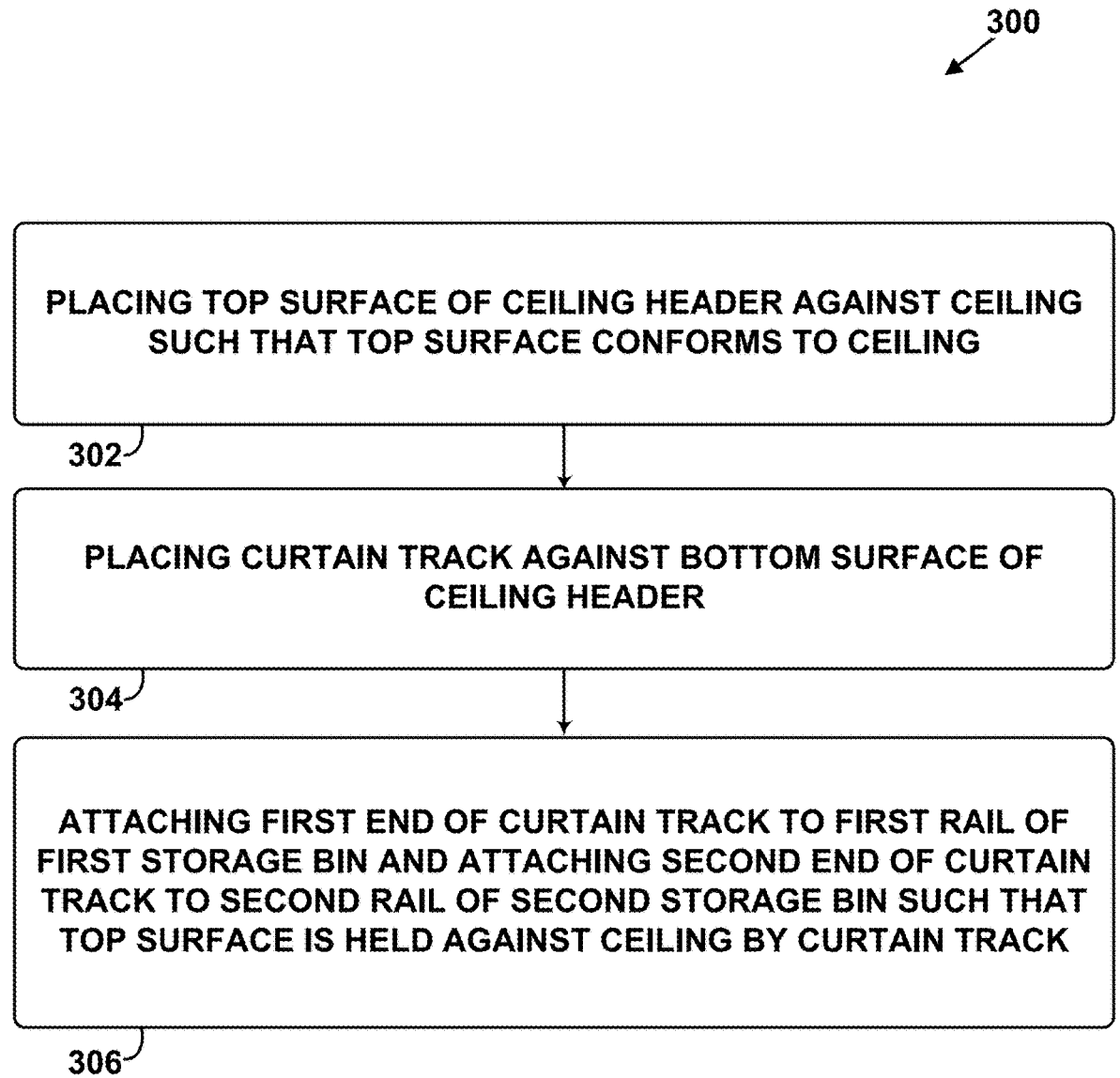
FIG. 12 is a block diagram of a method, according to an example.

FIG. 12 is a block diagram of a method 300 of installing a ceiling header system in an aircraft cabin that includes a ceiling between a first storage bin and a second storage bin. For example, an installer can perform the method 300 to install the ceiling header system 100 in the aircraft cabin 10.

At block 302, the method 300 includes placing a top surface of a ceiling header against the ceiling such that the top surface conforms to the ceiling. Referring to FIG. 1 for example, the installer can place the top surface 110 of the ceiling header 108 against the ceiling 102 such that the top surface 110 conforms to the ceiling 102.

At block 304, the method 300 includes placing a curtain track against a bottom surface of the ceiling header. For example, the installer can place the curtain track 114 against the bottom surface 112 of the ceiling header 108.

At block 306, the method 300 includes attaching a first end of the curtain track to a first rail of the first storage bin and attaching a second end of the curtain track to a second rail of the second storage bin such that the top surface is held against the ceiling by the curtain track. For example, the installer can attach the first end 116 of the curtain track 114 to the first rail 118 of the first storage bin 104 and attach the second end 120 of the curtain track 114 to the second rail 122 of the second storage bin 106 such that the top surface 110 is held against the ceiling 102 by the curtain track 114. The curtain track 114 can be attached to storage rails using fasteners and support fitting(s) as described above with reference to FIG. 8.

Examples of the present disclosure can thus relate to one of the enumerated clauses (EC) listed below.

EC 1 is a ceiling header system for an aircraft cabin that includes a ceiling between a first storage bin and a second storage bin, the ceiling header system comprising: a ceiling header comprising: a top surface that conforms to the ceiling; and a bottom surface that is opposite the top surface; and a curtain track, wherein the top surface is configured to be held against the ceiling via the curtain track being placed against the bottom surface, the curtain track being (i) attachable at a first end of the curtain track to a first rail of the first storage bin and (ii) attachable at a second end of the curtain track to a second rail of the second storage bin.

EC 2 is the ceiling header system of EC 1, wherein the top surface comprises a compressible gasket.

EC 3 is the ceiling header system of any of ECs 1 or 2, wherein at least a portion of the ceiling is concave and at least a portion of the top surface is convex to conform to the ceiling.

EC 4 is the ceiling header system of any of ECs 1-3, further comprising: a first support fitting attached to the bottom surface, wherein the first support fitting is configured to attach the ceiling header to the first rail.

EC 5 is the ceiling header system of EC 4, further comprising: a second support fitting attached to the bottom surface, wherein the second support fitting is configured to attach the ceiling header to the first rail.

EC 6 is the ceiling header system of any of ECs 1-5, further comprising: a third support fitting attached to the bottom surface, wherein the third support fitting is configured to attach the ceiling header to the second rail.

EC 7 is the ceiling header system of any of ECs 1-6, the ceiling header further comprising a concave side surface between the top surface and the bottom surface, wherein the concave side surface conforms to a convex surface of the second rail.

EC 8 is the ceiling header system of EC 7, the concave side surface comprising a compressible gasket.

EC 9 is the ceiling header system of any ECs 7-8, wherein the top surface extends beyond the bottom surface to form a first edge of the ceiling header with the concave side surface.

EC 10 is the ceiling header system of any of ECs 1-9, wherein the top surface meets the bottom surface at a second edge of the ceiling header.

EC 11 is the ceiling header system of any of ECs 1-10, wherein the top surface is configured to be held against the ceiling via the curtain track being placed against the bottom surface such that the first end of the curtain track is forward of the second end of the curtain track or such that that the second end of the curtain track is forward of the first end of the curtain track.

EC 12 is the ceiling header system of any of ECs 1-11, wherein the top surface defines a perimeter of an open top end of the ceiling header.

EC 13 is a ceiling header system for an aircraft cabin that includes a ceiling between a first storage bin and a second storage bin, the ceiling header system comprising: a first ceiling header comprising: a first top surface that conforms to the ceiling; and a first side surface that is adjacent to the first top surface, wherein the first side surface extends away from the first top surface moving from a first end of the first ceiling header toward a second end of the first ceiling header; and a substantially flat ceiling panel that is attachable to the first ceiling header at the second end of the first ceiling header.

EC 14 is the ceiling header system of EC 13, the first ceiling header further comprising a first flat bottom surface between the first side surface and the second end of the first ceiling header.

EC 15 is the ceiling header system of any of ECs 13-14, further comprising a second ceiling header that comprises: a second top surface that conforms to the ceiling; and a second side surface that is adjacent to the second top surface, wherein the second side surface extends away from the second top surface moving from a first end of the second ceiling header toward a second end of the second ceiling header, wherein the substantially flat ceiling panel is attachable to the second ceiling header at the second end of the second ceiling header.

EC 16 is the ceiling header system of any of ECs 13-15, wherein at least a portion of the ceiling is concave and at least a portion of the first top surface is convex to conform to the ceiling.

EC 17 is the ceiling header system of any of ECs 13-16, wherein the ceiling header system provides a storage area between the ceiling and the substantially flat ceiling panel when the ceiling header system is installed in the aircraft cabin.

EC 18 is the ceiling header system of any of ECs 13-17, wherein the substantially flat ceiling panel comprises a transparent or translucent aperture.

EC 19 is the ceiling header system of any of ECs 13-18, wherein the substantially flat ceiling panel comprises a light source, a speaker, or a display screen that is configured to be electrically coupled to a power source in the aircraft cabin.

EC 20 is a method of installing a ceiling header system in an aircraft cabin that includes a ceiling between a first storage bin and a second storage bin, the method comprising: placing a top surface of a ceiling header against the ceiling such that the top surface conforms to the ceiling; placing a curtain track against a bottom surface of the ceiling header; and attaching a first end of the curtain track to a first rail of the first storage bin and attaching a second end of the curtain track to a second rail of the second storage bin such that the top surface is held against the ceiling by the curtain track.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A ceiling header system for an aircraft cabin that includes a ceiling between a first storage bin and a second storage bin, the ceiling header system comprising:
   a ceiling header comprising:
      a top surface that conforms to the ceiling; and
      a bottom surface that is opposite the top surface; and
   a curtain track, wherein the top surface is configured to be held against the ceiling via the curtain track being placed against the bottom surface, the curtain track being (i) attachable at a first end of the curtain track to a first rail of the first storage bin and (ii) attachable at a second end of the curtain track to a second rail of the second storage bin, the curtain track having telescopic features configured for adjusting a length of the curtain track.

2. The ceiling header system of claim 1, wherein the top surface comprises a compressible gasket.

3. The ceiling header system of claim 1, wherein at least a portion of the ceiling is concave and at least a portion of the top surface is convex to conform to the ceiling.

4. The ceiling header system of claim 1, further comprising:
   a first support fitting attached to the bottom surface,
   wherein the first support fitting is configured to attach the ceiling header to the first rail.

5. The ceiling header system of claim 4, further comprising:
   a second support fitting attached to the bottom surface,
   wherein the second support fitting is configured to attach the ceiling header to the first rail.

6. The ceiling header system of claim 4, further comprising:
   a third support fitting attached to the bottom surface,
   wherein the third support fitting is configured to attach the ceiling header to the second rail.

7. The ceiling header system of claim 1, the ceiling header further comprising a concave side surface between the top surface and the bottom surface, wherein the concave side surface conforms to a convex surface of the second rail.

8. The ceiling header system of claim 7, the concave side surface comprising a compressible gasket.

9. The ceiling header system of claim 7, wherein the top surface extends beyond the bottom surface to form a first edge of the ceiling header with the concave side surface.

10. The ceiling header system of claim 1, wherein the top surface meets the bottom surface at a second edge of the ceiling header.

11. The ceiling header system of claim 1, wherein the top surface is configured to be held against the ceiling via the curtain track being placed against the bottom surface such that the first end of the curtain track is forward of the second end of the curtain track or such that that the second end of the curtain track is forward of the first end of the curtain track.

12. The ceiling header system of claim 1, wherein the top surface defines a perimeter of an open top end of the ceiling header.

13. A ceiling header system for an aircraft cabin that includes a ceiling between a first storage bin and a second storage bin, the ceiling header system comprising:
   a first ceiling header comprising:
      a first top surface that conforms to the ceiling; and
      a first side surface that is adjacent to the first top surface, wherein the first side surface extends away from the first top surface moving forward or aft from a first end of the first ceiling header toward a second end of the first ceiling header; and
   a substantially flat ceiling panel that is attachable to the first ceiling header at the second end of the first ceiling header.

14. The ceiling header system of claim 13, the first ceiling header further comprising a first flat bottom surface between the first side surface and the second end of the first ceiling header.

15. The ceiling header system of claim 13, further comprising a second ceiling header that comprises:
   a second top surface that conforms to the ceiling; and
   a second side surface that is adjacent to the second top surface, wherein the second side surface extends away from the second top surface moving forward or aft from a first end of the second ceiling header toward a second end of the second ceiling header,
   wherein the substantially flat ceiling panel is attachable to the second ceiling header at the second end of the second ceiling header.

16. The ceiling header system of claim 13, wherein at least a portion of the ceiling is concave and at least a portion of the first top surface is convex to conform to the ceiling.

17. The ceiling header system of claim 13, wherein the ceiling header system provides a storage area between the ceiling and the substantially flat ceiling panel when the ceiling header system is installed in the aircraft cabin.

18. The ceiling header system of claim 13, wherein the substantially flat ceiling panel comprises a transparent or translucent aperture.

19. The ceiling header system of claim 13, wherein the substantially flat ceiling panel comprises a light source, a speaker, or a display screen that is configured to be electrically coupled to a power source in the aircraft cabin.

20. A method of installing a ceiling header system in an aircraft cabin that includes a ceiling between a first storage bin and a second storage bin, the method comprising:
   placing a top surface of a ceiling header against the ceiling such that the top surface conforms to the ceiling;
   placing a curtain track against a bottom surface of the ceiling header; and
   using telescopic features of the curtain track to adjust a length of the curtain track, attaching a first end of the curtain track to a first rail of the first storage bin and attaching a second end of the curtain track to a second rail of the second storage bin such that the top surface is held against the ceiling by the curtain track.

\* \* \* \* \*